Dec. 20, 1960   A. L. MEYER   2,965,381
COLLET STOP
Filed Feb. 18, 1958

Adolf L. Meyer
INVENTOR.

BY *Clarence A. O'Brien*
*and Harvey B. Jacobson*
Attorneys

United States Patent Office 2,965,381
Patented Dec. 20, 1960

2,965,381

COLLET STOP

Adolf L. Meyer, 106 Conorado Ave., Los Altos, Calif.

Filed Feb. 18, 1958, Ser. No. 715,917

10 Claims. (Cl. 279—46)

This invention relates in general to machine tool accessories and pertains more particularly to a device particularly adapted for use in conjunction with a collet and serving to provide a limit stop to control the depth of penetration of a workpiece into a collet.

In forming a number of like workpieces, as for example in a lathe or the like, the use of collets is a common expedient, the collet performing the function of gripping the workpiece while the machining operations are performed thereon. Ordinarily, such collets are of the split-type and have an enlarged tapered gripping end which is adapted to be engaged within the tapered end of a lathe spindle and in association therewith there is provided a drawbar connected to the inner end of the collet and which draws the same inwardly with respect to the lathe spindle so as to force the split externally tapered end of the collet into gripping engagement with a workpiece. The tool post of the lathe remains either in a fixed position for performing one or more cutting operations or may be continually indexed back to a common starting point to perform the one or more cutting operations of the workpiece. In releasing the workpiece from the collet, the drawbar is loosened which permits the collet to move outwardly with respect to the lathe spindle and thus release its grip on the workpiece. By the same token, it will be readily appreciated that if the diameters of the workpieces vary as much as a few thousandths of an inch, the collet will have to be drawn into the lathe spindle more or less dependent upon the particular external diameter of the workpiece so that the fixed position of the tool post or the initially indexed position thereof will not cause engagement of the lathe tool in the precise point with each workpiece even if a material stop is placed within the collet so as to limit the extent of material which is disposed within the collet. It is therefore a primary object of this invention to provide an improved collet stop assembly which will assure the correct positioning of workpieces of any desired number regardless of variations in the external diameters thereof and of the final position of the collet with respect to the lathe spindle necessary to firmly grip the workpiece within the collet.

Another object of this invention is to provide an improved collet stop assembly wherein the mechanism is so constructed and arranged as to be anchored within a drawbar or the like utilized for holding the collet and drawing the same into engagement in the tapered portion of the lathe spindle such that the stop collar forming a part of the stop assembly will remain in fixed relationship to the bed of the lathe regardless of the precise positioning of the collet and variations thereof with respect to the bed of the lathe as may be occasioned by variations in the external diameters of the workpieces being chucked.

A further object of this invention is to provide an improved collet stop having anchoring means associated therewith for securely fastening the collet stop to an associated drawbar or the like and wherein the anchor member is provided with a lock nut cooperating with wedges slidably carried by the anchor member and for forcing the same into frictional contact with the inner surface of the drawbar, there being an adjusting screw threadedly projecting through the anchor member and carrying at the collet end thereof a stop collar to be adjusted to a fixed position relative to the lathe bed and there further being a jamb nut engaged upon the adjusting screw for locked engagement against the anchor member for holding a predetermined position of the adjusting screw and stop collar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
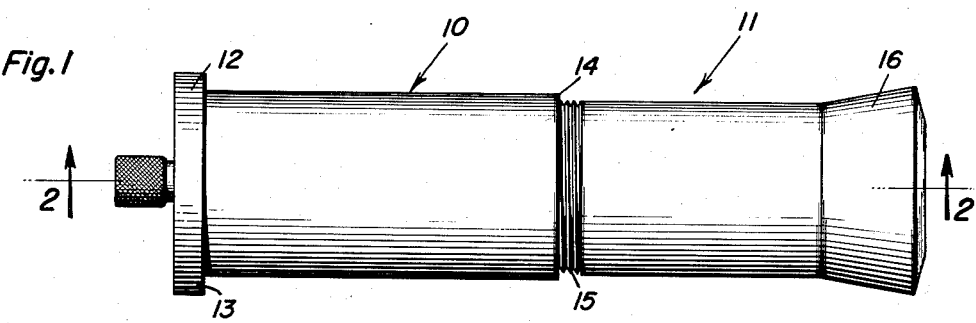
Figure 1 is an elevational view of a conventional drawbar and collet assembly, the drawbar being foreshortened for the purpose of clarity and illustrating the knurled end of the adjusting screw projecting outwardly from the drawbar.

Referring at this time more particularly to Figure 1, the reference character 10 indicates in general a conventional drawbar assembly such as is commonly utilized in conjunction with collets of the type indicated generally by the reference character 11. It is to be understood that both the assemblies 10 and 11 are entirely conventional in nature and form no departure from the normal construction thereof, but are shown only for the purpose of illustrating the environmental use of the collet stop hereinafter more particularly described. By way of explanation, it is to be appreciated that the drawbar assembly 10, particularly as shown in Figure 1, is considerably foreshortened for the purpose of clarity, the same being substantially co-extensive in length with the lathe spindle with which it is associated, that is, being of such length as to extend a material distance from the outer end of the lathe spindle toward the headstock end of such spindle. The shoulder 12 on the drawbar is adapted to engage the outer end, remote from the headstock end, of the lathe spindle and the face 13 thereof is disposed in abutting relationship to the corresponding end of the lathe spindle. The drawbar normally fits substantially snugly within the lathe spindle but not so tightly therein as to prevent the same to be easily inserted and withdrawn from the lathe spindle. The inner end 14 of the drawbar terminates short of the headstock end of the lathe spindle and is internally threaded at this end to receive a threaded end portion 15 of the collet assembly 11. The collet assembly itself is of the conventional split type and is provided with an enlarged externally tapered head end 16, the outer surface of which is adapted to be engaged against the tapered inner surface of the headstock end of the lathe spindle so that as the collet is threaded into the end 14 of the drawbar, the enlarged head 16 thereof will be compressed so as to chuck the workpiece therein.

For the purpose of clarity, the lathe spindle and lathe assembly are not shown since such constructions are well known in their use with conjunction of the drawbar 10 and collet 11.

Figure 2:
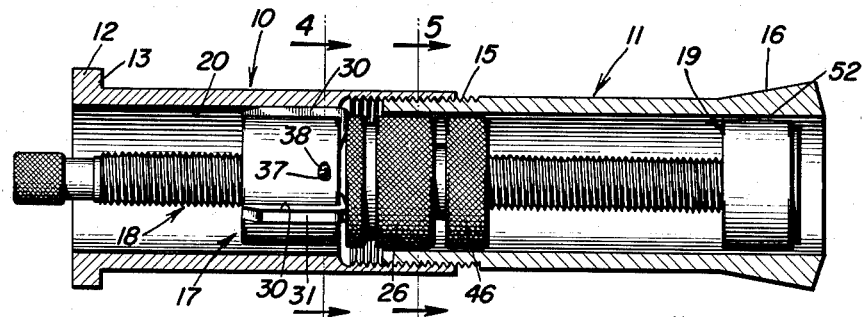
Figure 2 is a longitudinal section taken substantially along the plane of section line 2—2 of Figure 1 illustrating the position of the collet stop within the assembly shown in elevation in Figure 1.

As shown in Figure 2, the collet stop assembly consists essentially of an anchor assembly indicated generally by the reference character 17, an adjusting screw indicated generally by the reference character 18 and a stop collar assembly indicated generally by the reference character 19. As can also be seen in this figure, the anchor assembly 17 engages against the inner surface 20 of the drawbar assembly 10 and it will thus be appreciated that the stop assembly is fixed in relationship to the drawbar and consequently to the lathe bed and component parts of the lathe assembly rather than being dependent upon the positioning of the collet assembly 11 as is the case with collet stop assembly heretofore known.

Figure 3:
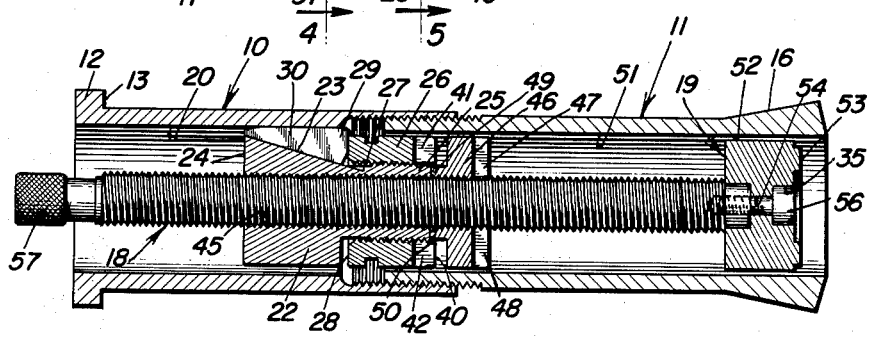
Figure 3 is a longitudinal section similar to Figure 2 but taken sectionally of the collet stop assembly also.

As can be seen most clearly in Figure 3, the anchor assembly 17 consists essentially of an anchor member 22 having a series, preferably three, of longitudinally extending slots 23 therein whose bottom walls incline inwardly from the end face 24 of the anchor member toward the opposite end thereof, the opposite ends terminating in a cylindrical, externally threaded shank portion 25 upon which the lock nut 26 is threadedly engaged. The diameter of the shank 25 is such as to be greater than the innermost end portions 27 of the slots 23 and the lock nut 26 has, on its inner end, an end face portion 28 which is engageable against the wide end portions 29 of wedge block elements 30 slidably disposed within the slots 23.

Figure 6:
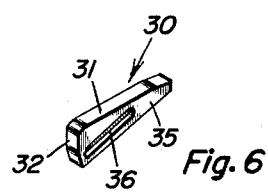
Figure 6 is a perspective view showing one of the wedge blocks.

One of the wedge blocks is shown most clearly in Figure 6 and will be seen to include an outer surface portion 31 which is engageable with the inner surface 20 of the drawbar 10 and having a wide end face 32 against which the end face 28 of the lock nut 26 is engaged to force the wedge block up the inclined bottom wall of the associated slot 23. In this manner, it will be readily appreciated that as the lock nut 26 is threaded toward the end 24 of the anchor member 22, the wedge blocks will be forced upwardly along the inclined bottom walls of the slots 23 and will thus be projected radially outwardly of the cylindrical outer surface of the anchor member 22 and into engagement with the inner surface 20 of the drawbar 10.

Figure 4:
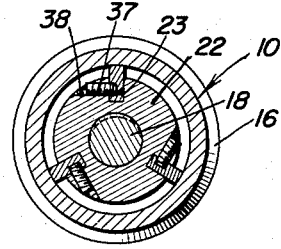
Figure 4 is a transverse section taken substantially along the plane of section line 4—4 in Figure 2 and illustrating details of the locking wedge assembly.
Figure 5:
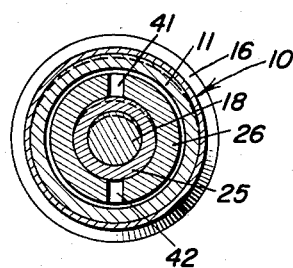
Figure 5 is a transverse sectional view taken substantially along the plane of section line 5—5 in Figure 2 illustrating details of the lock nut and its association with the component parts of the collet stop assembly.

One side face 35 of each wedge block 30 is provided with an elongate slot or notch 36 therein and setscrew elements 37, see Figure 4, are threadedly engaged within tangential bores 38 of the anchor member 22 so as to project inwardly into the slots 36 and thus retain the wedge blocks within the slots 23 in the anchor member.

The headstock end 40 of the lock nut 26 is provided with diametrically opposed recesses or notches 41 and 42 so as to permit a tubular wrench to be inserted into engagement therewith and force the nut 26 to engage the wedge block 30 firmly against the inner surface 20 of the drawbar 10 and thus firmly affix the anchor member to the drawbar in fixed relationship thereto.

The anchor member 22 is provided with a centrally disposed and longitudinally extended threaded bore 45 through which the adjusting screw 18 is threadedly engaged and a jam nut 46 is provided on the adjusting screw and is likewise provided with diametrically opposed slots or notches 47 and 48 for engagement by a tubular wrench so that the reduced collar portion 49 of the jam nut may have its end face engaged against the corresponding end face 50 of the shank 25 of the anchor member 22 and thus lock onto the threads of the adjusting screw 18 and prevent rotation of the adjusting screw 18 with respect to the anchor member 22. The headstock end of the adjusting screw 18 carries the cylindrical stop collar 19 which, as shown, clears the inner surface 51 of the collet 11 as indicated by the reference character 52 so as to permit the headstock end 16 of the collet to be inwardly deflected by the taper of the headstock end of the spindle to clamp the workpiece therewithin. The outer face 53 of the stop collar 19 forms an abutting face or limit stop for the inner end of the workpiece as the same is disposed within the clamping end of the collet 11. The stop collar 19 is provided with a bore 54 and a counterbore 55 within which the head end 56 of a cap screw is received, the same serving to removably affix the stop collar to the headstock end of the adjusting screw 18, this end of the adjusting screw being suitably tapped to receive the tap screw as will be readily appreciated.

The outer end of the adjusting screw 18 is provided with a knurled end portion 57 for the purpose of adjusting the stop collar 19 in and out with respect to the lathe bed.

It is to be appreciated that the above construction firmly affixes the stop collar 19 in fixed relationship to the lathe bed rather than in fixed relationship to the collet 11 as is the conventional construction. Usually, the stop collar 19 or its equivalent is fixed relative to the collet 11 by virtue of some means anchoring the same with respect directly to the collet 11. In operation of the collet, the distance between the face 13 of the drawbar and the end 14 thereof and the positioning of the drawbar relative to the lathe bed remains fixed whereas the collet 11 may move longitudinally or axially back and forth dependent upon the particular size of the workpiece being inserted thereinto. For example, with a larger workpiece in the collet, as the collet is screwed into the drawbar 10 to engage the tapered face 16 thereof against the corresponding tapered face of the headstock of a lathe spindle, the collet will not extend to the left in Figures 1, 2 and 3 as far as it would were the diameter of the workpiece less with which the collet is engaged. Consequently, if the stop collar 19 is fixed relative to the collet, the workpiece will be operated upon at different lengths dependent upon the particular diameter thereof. In normal manufacturing processes the tolerances of the diameters of the workpieces will be such, say in the neighborhood of 0.005 inch as to cause a material difference in relative positioning of the workpieces with conventional collet stop constructions. Consequently, for a simple cut-off operation the lengths of the cut-off workpieces may vary considerably whereas in the particular construction illustrated in the drawings and described above, for practical purposes the length of any number of workpieces engaged by the collet and cut-off by a tool fixed with relationship to the lathe bed will not materially differ even though the external diameters of these workpieces will be substantially different and within the range for which the collet may accommodate them. In other words, the collet stop construction according to this invention is fixed with relationship to the lathe bed independently of the particular positioning of the collet assembly 11 with relationship thereto and for this reason many workpieces may be made with the set-up shown in Figures 1, 2 and 3 with very little if any variance in the lengths of the workpieces cut-off or machine, whatever the case may be.

What is claimed as new is as follows:

1. A material stop assembly for limiting the bite of a collet upon a workpiece, comprising an anchor member adapted to be disposed within a drawbar or the like, means on said anchor member for securely locking the same to an associated drawbar, said means including a lock nut threadedly engaged upon said anchor member, an adjusting screw projecting through and threadedly engaged with said anchor member, a material stop collar fixed to one end of said screw for positioning in and near the open end of a collet to act as a limit stop for a workpiece inserted thereinto, a jam nut carried by said screw between said lock nut and said stop collar for engagement with the anchor member to prevent rotation of the screw within said anchor member.

2. In combination with a lathe spindle or the like having a collet engaged therewith and forming a continuation thereof, a material stop assembly fixed within said spindle and having a portion thereof projecting into said collet and terminating in a material stop collar disposed inwardly of the open end of the collet to provide a limit stop for material inserted into the collet, said assembly including an anchor member having a lock nut threadedly engaged thereon and engaging wedge blocks and forcing the latter into frictional contact with the interior of said spindle, a threaded screw threaded through said anchor member and projecting therefrom toward the open end of said collet, said material stop collar element being carried on the end of said screw, and a jam nut threaded upon said screw and engaged with said anchor member to hold said stop collar in predetermined position relative to said open end of the collet.

3. In combination with a lathe spindle or the like having a collet engaged therewith and forming a continuation thereof, a material stop assembly fixed within said spindle and having a portion thereof projecting into said collet and terminating in a material stop collar disposed inwardly of the open end of the collet to provide a limit stop for material inserted into the collet, said assembly including an anchor member having a lock nut threadedly engaged thereon and engaging wedge blocks and forcing the latter into frictional contact with the interior of said spindle, a threaded screw threaded through said anchor member and projecting therefrom toward the open end of said collet, said material stop collar element being carried on the end of said screw, and a jam nut threaded upon said screw and engaged with said anchor member to hold said stop collar in predetermined position relative to said open end of the collet, said anchor member being provided with a series of inclined slots, said elements engaging the inner surface of said spindle comprising wedge blocks slidable in said slots.

4. A material stop assembly comprising a cylindrical anchor member having a series of longitudinally extending and circumferentially spaced slots therein, the bottom walls of said slots being inclined inwardly from one end of the member toward the other end thereof, said other end of the member terminating in an externally threaded shank, a wedge block slidably engaged in each of said slots and each having the wide end thereof facing said other end of the member, a lock nut threadedly engaged on said shank and having an inner end face engaged with the wide ends of said wedge block for forcing the same up said inclined bottom walls of the slots and into projected positions extending radially outwardly of said anchor member, said member having a centrally disposed, threaded longitudinal bore therethrough, a threaded screw engaged through said bore and projecting on opposite sides thereof, a cylindrical material stop collar element fixed to said screw on the shank side of said anchor member, and a jam nut threaded on said screw and engaging the end face of said shank to lock said screw to said anchor member.

5. A material stop assembly for limiting the bite of a collet upon a workpiece, comprising an anchor member adapted to be disposed within a drawbar or the like, means on said anchor member for securely locking the same to an associated drawbar, said means including a lock nut threadedly engaged upon said anchor member, an adjusting screw projecting through and threadedly engaged with said anchor member, a material stop collar fixed to one end of said screw for positioning in and near the open end of a collet to act as a limit stop for a workpiece inserted thereinto, a jam nut carried by said screw between said lock nut and said stop collar for engagement with the anchor member to prevent rotation of the screw within said anchor member, including a circular centrally located and outwardly projecting flange on the outer face of said collar stop.

6. In combination with a lathe spindle or the like having a collet engaged therewith and forming a continuation thereof, a material stop assembly fixed within said spindle and having a portion thereof projecting into said collet and terminating in a material stop collar disposed inwardly of the open end of the collet to provide a limit stop for material inserted into the collet, said assembly including an anchor member having a lock nut threadedly engaged thereon and engaging wedge blocks and forcing the latter into frictional contact with the interior of said spindle, a threaded screw threaded through said anchor member and projecting therefrom toward the open end of said collet, said material stop collar element being carried on the end of said screw, and a jam nut threaded upon said screw and engaged with said anchor member to hold said stop collar in predetermined position relative to said open end of said collet, said anchor member being provided with a series of inclined slots, said elements engaging the inner surface of said spindle comprising wedge blocks slidable in said slots, including a longitudinally extending bore formed through the center of said stop collar having a counterbore in the outer end thereof, a headed fastening means removably secured through said bore to said screw, said counterbore being of more than sufficient depth to receive therein the head of said fastening means whereby the outer end of said stop collar will project outwardly beyond the head of said fastening means, and including a circular and outwardly projecting flange on the outer face of said collar stop.

7. A material stop assembly for limiting the bite of a collet upon a workpiece, comprising an anchor member adapted to be disposed within a drawbar or the like, means on said anchor member for securely locking the same to an associated drawbar, said means including a lock nut threadedly engaged upon said anchor member, an adjusting screw projecting through and threadedly engaged with said anchor member, a material stop collar fixed to one end of said screw for positioning in and near the open end of a collet to act as a limit stop for a workpiece inserted thereinto, a jam nut carried by said screw between said lock nut and said stop collar for engagement with the anchor member to prevent rotation of the screw within said anchor member, including a longitudinally extending bore formed through the center of said stop collar having a counterbore in the outer end thereof, a headed fastening means removably secured through said bore to said screw, said counterbore being of more than sufficient depth to receive therein the head of said fastening means whereby the outer end of said stop collar will project outwardly beyond the head of said fastening means.

8. In combination with a lathe spindle or the like having a collet engaged therewith and forming a continuation thereof, a material stop assembly fixed within said spindle and having a portion thereof projecting into said collet and terminating in a material stop collar disposed inwardly of the open end of the collet to provide a limit stop for material inserted into the collet, said assembly including an anchor member having a lock nut threadedly engaged thereon and engaging wedge blocks and forcing the latter into frictional contact with the interior of said spindle, a threaded screw threaded through said anchor member and projecting therefrom toward the open end of said collet, said material stop collar element being carried on the end of said screw, and a jam nut threaded upon said screw and engaged with said anchor member to hold said stop collar in predetermined position relative to said open end of the collet, said anchor member being provided with a series of inclined slots, said elements engaging the inner surface of said spindle comprising wedge blocks slidable in said slots, including a longitudinally extending bore formed through the center of said stop collar having a counterbore in the outer end thereof, a headed fastening means removably secured through said bore to said screw, said counterbore being of more than sufficient depth to receive therein the head of said fastening means whereby the outer end of said stop collar will project outwardly beyond the head of said fastening means.

9. A material stop assembly comprising a cylindrical anchor member having a series of longitudinally extending and circumferentially spaced slots therein, the bottom walls of said slots being inclined inwardly from one end of the member toward the other end thereof, said other end of the member terminating in an externally threaded shank, a wedge block slidably engaged in each of said slots and each having the wide end thereof facing said other end of the member, a lock nut threadedly engaged on said shank and having an inner end face engaged with the wide ends of said wedge block for forcing the same up said inclined bottom walls of the slots and into projected positions extending radially outwardly of said anchor member, said member having a centrally disposed, threaded longitudinal bore therethrough, a threaded screw engaged through said bore and projecting on opposite sides thereof, a cylindrical material stop collar element fixed to said screw on the shank side of said anchor member, and a jam nut threaded on said screw and engaging the end face of said shank to lock said screw to said anchor member, including a longitudinally extending bore formed through the center of said stop collar having a counterbore in the outer end thereof, a headed fastening means removably secured through said bore to said screw, said counterbore being of more than sufficient depth to receive therein the head of said fastening means whereby the outer end of said stop collar will project outwardly beyond the head of said fastening means.

10. The combination of claim 4, including a longitudinally extending bore formed through the center of said stop collar having a counterbore in the outer end thereof, a headed fastening means removably secured through said bore to said screw, said counterbore being of more than sufficient depth to receive therein the head of said fastening means whereby the outer end of said stop collar will project outwardly beyond the head of said fastening means, and including a circular, centrally located, and outwardly projecting flange on the outer face of said collar stop.

References Cited in the file of this patent

UNITED STATES PATENTS

| | | |
|---|---|---|
| 2,396,504 | Grey | Mar. 12, 1946 |
| 2,502,719 | Haley et al. | Apr. 4, 1950 |
| 2,756,059 | Knapp | July 24, 1956 |
| 2,830,821 | Bystrom | Apr. 15, 1958 |
| 2,871,023 | McCormick | Jan. 27, 1959 |